United States Patent

Ikoma

[11] 4,410,853
[45] Oct. 18, 1983

[54] FREQUENCY DETECTOR

[75] Inventor: Junichi Ikoma, Yokosuka, Japan

[73] Assignee: Hitachi, Ltd., Tokyo, Japan

[21] Appl. No.: 328,622

[22] Filed: Dec. 8, 1981

[30] Foreign Application Priority Data

Dec. 13, 1980 [JP] Japan .................. 55-178151[U]

[51] Int. Cl.³ ........................... G01P 3/48; G01P 3/54
[52] U.S. Cl. ...................................... 324/167; 324/174
[58] Field of Search ..................... 324/166, 167, 174; 318/110, 309, 318, 147, 606

[56] References Cited

U.S. PATENT DOCUMENTS 3,377,556   4/1968   Corcoran ..................... 324/166

FOREIGN PATENT DOCUMENTS

2148703   4/1973   Fed. Rep. of Germany ...... 324/166
1009979  11/1965   United Kingdom ............. 324/174

Primary Examiner—Stanley T. Krawczewicz
Attorney, Agent, or Firm—Antonelli, Terry & Wands

[57] ABSTRACT

A frequency detector comprising first, second and third conductive patterns. The first conductive pattern includes an even number of first straight conductive pieces which are disposed radially at regular intervals and sequentially connected in series alternately through first inner periphery conductive pieces and first outer periphery conductive pieces. The second conductive pattern includes an even number of second straight conductive pieces disposed radially at predetermined intervals between the adjacent two first straight conductive pieces at the outer periphery sides of the respective first inner periphery conductive pieces and connected in series. The third conductive pattern includes an even number of third straight conductive pieces disposed radially at predetermined intervals between the adjacent two first straight conductive pattern at the inner periphery sides of the respective first outer periphery conductive piece and connected in series. A first and a second terminal are provided at both ends of the first conductive pattern. The first, second and third conductive patterns are connected in series between the first terminal and a third terminal provided at an end of the second or third conductive pattern.

6 Claims, 8 Drawing Figures

FREQUENCY DETECTOR

BACKGROUND OF THE INVENTION

The present invention relates to a frequency detector for obtaining rotation speed information and phase information of a rotating device such as a motor.

Such a frequency detector in the prior art for obtaining rotation speed information and phase information of the rotating device is disclosed, for example, in Japanese Patent Publication No. 2960/66. This frequency detector contains a detecting coil radially disposed on a disc, and a mgnetic disc rotating with a rotating device and disposed in close and coaxial relationship with the disc carrying the detecting coil so that frequency information of one frequency and phase information corresponding to the rotation of the rotating device and can be obtained from electric currents flowing through the detecting coil in accordance with the rotation of the rotating device.

In order to control the phase of an apparatus such as a motor, of which responsive speed is relatively slow, speed control is usually made to increase an apparent responsive speed or to increase an apparant cut-off frequency thereof. There are various methods of obtaining speed information from the motor so as to make such a speed control. Among the various methods, a method using a frequency generator which utilizes a frequency detector as an armature thereof is most simple and accurate.

Recently, a video apparatus, an audio set or the like generally uses a direct current motor of an opposite flat plate type which inlcudes a rotor and a stator each in the form of a flat plate, between which a magnetic air gap in the form of a flat plate is formed. A frequency generator necessary for effecting speed control of such a motor of an opposite flat plate type uses, for example, a frequency detector shown in FIG. 1. The frequency detector includes a conductive pattern 1 formed on a printed circuit board, and it is disposed in the magnetic air gap of the motor in opposite relationship to the rotor in the form of the flat plate to serve as an armature of the frequency generator, so that a frequency signal proportional to rotation speed of the motor can be obtained from terminals 2 and 3 of the conductive pattern 1.

Figure 1:
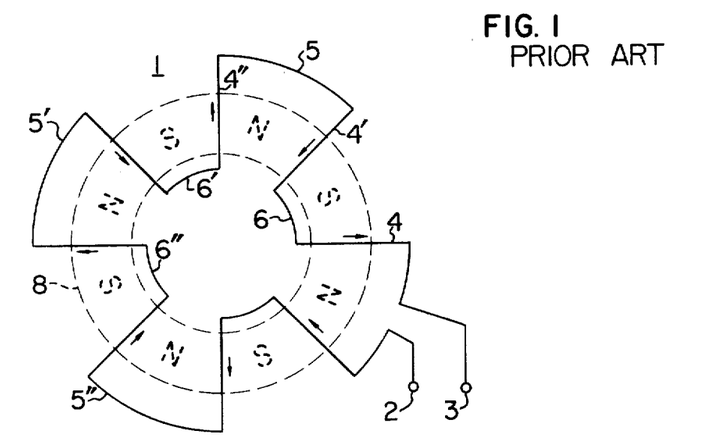
FIG. 1 is a plan view showing a conductive pattern of a conventional frequency detector.

The frequency detector shown in FIG. 1 includes the conductive pattern 1 formed on the substantially round printed circuit board with a plurality of straight conductive pieces 4, 4', 4", ..., outer periphery conductive pieces 5, 5', 5", ... and inner periphery conductive pieces 6, 6', 6", ... successively connected to one another in series. The 2n straight conductive pieces 4, 4', 4", ... (where n is an integer, and in this case n=4) are radially disposed on the round printed circuit board at regular intervals. Each of the outer periphery conductive pieces 5, 5', 5", ... in the form of arcs of a concentric circle connects between outer periphery ends of the two adjacent straight conductive pieces alternately. Each of the inner periphery conductive pieces 6, 6', 6", ... in the form of arcs of another concentric circle connects between inner periphery ends of the two adjacent straight conductive pieces alternately. Such a conductive pattern is disposed in opposite relationship with permanent magnets 8 attached on a rotor in the form of a flat plate thereby to produce a frequency signal proportional to the number of revolution from the terminals 2 and 3 in response to the rotation of the rotor.

Suppose that the pole number of the motor for applying such a conductive pattern is l, the rotation speed is N (r.p.s.) and the number of the straight conductive pieces 4, 4', 4", ... is m, the frequency f [Hz] of the signal obtained between terminals 2 and 3 is given by the equation (2) under the condition of the following equation (1).

$$m/l = (2n+1) \tag{1}$$

where n = 0, 1, 2, ...

$$f = \frac{m \cdot N}{2} \text{ [Hz]} \tag{2}$$

In the example shown in FIG. 1, the pole number l of the motor is 8 and the number of the straight conductive pieces is 8. Therefore, m/l = 1. This satisfies the condition of the equation (1). The signal frequency f can be obtained from the equation (2). Referring to FIG. 1, it will be noted that the direction of the electromotive force in the respective straight conductive pieces 4, 4', 4", ... at a certain moment can be shown by arrows.

When the speed control for the motor or the like will be made on the basis of the output signal from the frequency detector as shown in FIG. 1, it is necessary to convert the frequency signal obtained from the frequency detector as a control signal for controlling the speed of the motor into a voltage signal. As a circuit for converting the frequency signal into the voltage signal, there are known a method of using a sample-and-hold circuit and a pulse counting method of effecting a counting operation in response to a rising edge of the frequency signal. In the method of using the sample-and-hold circuit, phase rotation appears due to a time required to sample the frequency signal and convert it into the voltage signal. In the pulse counting method, phase rotation also appears due to a time required to count the frequency of the frequency signal and to convert the count value to the voltage signal by a smoothing circuit. If the phase rotation between the frequency signal and the converted voltage signal is large, it is difficult to stably control the speed of the motor in accordance with the voltage signal since the frequency indicated by the voltage signal and an actual frequency at present are largely different. Therefore, in order to stably control the speed, it is necessary to minimize the phase rotation when the frequency signal is converted to the voltage signal. In either of the above two methods, since the phase rotation can be more reduced as a frequency of the signal indicating the speed information becomes higher, it is preferable to make higher the output frequency of the frequency detector for taking out the speed information for the same rotation speed of the motor.

On the other hand, in view of phase control of the motor, the gain of a phase detecting circuit in the phase control system becomes advantageously higher at a higher output frequency of the frequency detector acting as a phase information of the motor depending on the frequency of the reference phase signal used in the phase control system. However, if the gain is too high, it is difficult to stably control the phase. If operation of the phase control becomes unstable due to a too high gain of the phase detecting circuit, there is a method of inserting an attenuator in the output of the phase detecting circuit to reduce the gain. However, in this method, a range for effecting a phase lock of the phase detecting circuit becomes undesirably narrower. Thus, the output frequency of the frequency detector as the phase information has a proper value based on the decided system construction.

Therefore, it is necessary for phase control of an apparatus with slow responsive speed such as a motor to take out two signals with different frequencies for speed information and phase information. Consequently, in a conventional apparatus, two separate frequency detectors, for example, have been used to obtain two signals with different frequencies, or a single frequency detector for generating a high frequency signal for speed information is used to divide its output frequency and obtain a low frequency signal for phase information. However, there was a drawback of increasing a cost of the frequency generator remarkably in either of the two methods.

SUMMARY OF THE INVENTION

It is an object of the present invention to obviate the above described drawbacks of the conventional frequency detector and to provide an inexpensive frequency detector in which two frequency signals with different frequencies can be separately obtained at the same time.

In order to achieve such an object, the frequency detector of the present invention comprises:

a first conductive pattern including an even number of straight conductive pieces disposed radially at regular intervals, the straight conductive pieces being sequentially connected by inner periphery conductive pieces and outer periphery conductive pieces alternately in series;

a second conductive pattern including an even number of straight conductive pieces disposed radially at the outer periphery side of each of the inner periphery conductive pieces of the first conductive pattern at regular intervals and connected in series; and a third conductive pattern including an even number of straight conductive pieces disposed radially at the inner periphery side of each of the outer periphery conductive pieces of the first conductive pattern at regular intervals and connected in series;

a first signal with a relatively low frequency being derived from the first conductive pattern, the first, second and third conductive patterns being connected in series to derive a second signal with a higher frequency than that of the first signal from the series circuit of the first, second and third conductive patterns.

DESCRIPTION OF THE PREFERRED EMBODIMENT

The present invention will be described in detail with reference to the attached drawings.

Figure 2:
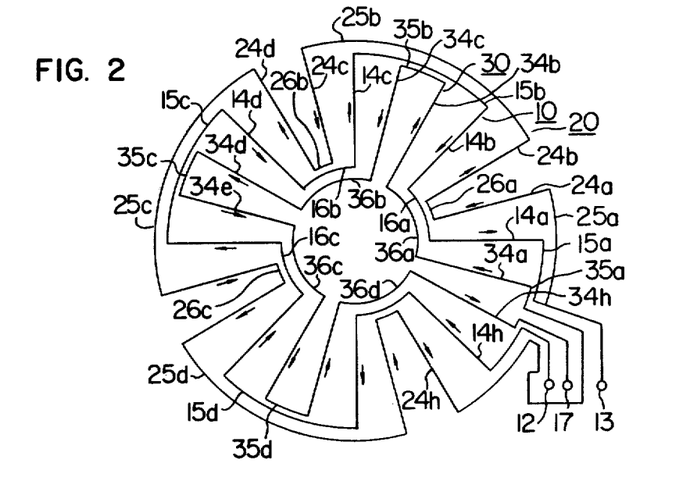
FIG. 2 is a plan view showing conductive patterns of a first embodiment of a frequency detector according to the present invention.

In FIG. 2 showing a first embodiment of a frequency detector according to the present invention, reference numeral 10 denotes a first conductive pattern, 20 a second conductive pattern and 30 a third conductive pattern. In the embodiment shown in FIG. 2, the first conductive pattern 10 is the same as that in the conductive pattern 1 shown in FIG. 1. The pattern 10 contains a plurality of first straight conductive pieces 14a, 14b, 14c, . . . (the number of pieces is 2n where $n \geq 1$ and in this example n=4) disposed radially at regular intervals. Each of first outer periphery conductive pieces 15a, 15b, 15c, . . . in the form of circular arcs connects an outer periphery end of associated one of the straight conductive pieces with an outer periphery end of an adjacent straight conductive piece disposed at one end of the associated straight conductive piece, and each of first inner periphery conductive pieces 16a, 16b, 16c, . . . in the form of circular arcs connects an inner periphery end of the associated straight conductive piece with an inner periphery end of an adjacent straight conductive piece disposed at the other end of the associated straight conductive piece, so that the straight conductive pieces are sequentially connected in series alternately through the inner periphery conductive pieces and the outer periphery conductive pieces. Each of the inner periphery conductive pieces is disposed on a concentric circle and each of the outer periphery conductive pieces is also disposed on another concentric circle. As shown in FIG. 2, outer periphery ends of the two adjacent straight conductive pieces (14a and 14b for example) are connected to output terminals 12 and 13 through conductors.

The second conductive pattern 20 contains 2n (where n is an integer and in this example n=4) second straight conductive pieces 24a, 24b, 24c, . . . . . An even number of the conductive pieces, in this case two conductive pieces 24a and 24b, for example, are disposed radially between a pair of two adjacent straight conductive pieces, for example 14a and 14b, of the first straight conductive pieces 14a, 14b, 14c, . . . , of which ends at the inner periphery side are connected to each other through corresponding one of the inner periphery conductive pieces 16a, 16b, 16c, . . . , in this case 16a, and are disposed at the outer periphery side of the corresponding inner periphery conductive pieces, in this case 16a. The second straight conductive pieces 24a, 24b, . . . . are disposed at intervals of $\frac{1}{2}n+1$ (where n is an integer and in this example n=1) of the interval of the first straight conductive pieces 14a, 14b, that is $\frac{1}{4}$ intervals thereof (in this case, at 15 degree intervals). The inner periphery ends of the two adjacent second straight conductive pieces, for example 24a and 24b, are connected to each other through corresponding one of second inner periphery conductive pieces 26a, 26b, 26c, ..., for example 26a, in the form of circular arcs. The outer periphery end of each of the second straight conductive pieces (for example, conductive piece 24b) is connected to the outer periphery end of the adjacent second straight conductive piece (for example, 24c) beyond the adjacent pair of the first straight conductive pieces (for example, conductive pieces 14b and 14c) through corresponding one of second outer periphery conductive pieces 25a, 25b, 25c, 25d, ... (for example, 25b) in the form of circular arcs. Thus, the second straight conductive pieces 24a, 24b, 24c, ... are sequentially connected in series alternately through the second inner periphery conductive pieces and the second outer periphery conductive pieces. The second inner periphery conductive pieces are disposed on a concentric circle, and the second outer periphery conductive pieces are disposed on another concentric circle.

The third conductive pattern 30 contains 2n (where n=4 in this example) third straight conductive pieces 34a, 34b, 34c, .... An even number of the third straight conductive pieces, in this case two conductive pieces 34b and 34c for example, are disposed radially between a pair of the adjacent first straight conductive pieces, for example 14b and 14c, of which ends at the outer periphery side are connected to each other through corresponding one of the first outer periphery conductive pieces 15a, 15b, 15c, 15d, ..., in the case 15b, and are disposed at the inner periphery side of the corresponding outer periphery conductive pieces, in this case 15b. The third straight conductive pieces are disposed at intervals of ½n+1 (in this example n−1) of the regular interval of the straight conductive pieces 14b, 14c (in this example, at 15 degree intervals). The outer periphery ends of the two adjacent third straight conductive pieces, for example 34b and 34c are connected to each other through corresponding one of third outer periphery conductive piece 35a, 35b, 35c, ..., for example 35b, in the form of circular arcs. The inner periphery end of each of the third straight conductive pieces (for example, conductive piece 34c) is connected to the inner periphery end of the adjacent thrid straight conductive piece (for example, 34d) beyond the pair of two adjacent first straight conductive pieces (for example, conductive pieces 14c and 14d) through corresponding one of third inner periphery conductive pieces 36a, 36b, 36c, ... (for example 36b) in the form of circular arcs. Thus, the third straight conductive pieces 34a, 34b, 34c, ... are sequentially connected in series alternately through the third inner periphery conductive pieces and the third outer periphery conductive pieces. The third inner periphery conductive pieces are disposed on a concentric circle, and the third outer periphery conductive pieces are also disposed on another concentric circle. Thus, all of the straight conductive pieces of the first, second and third conductive patterns are disposed at given intervals, that is at 15 degree intervals.

The outer periphery end of one of the second straight conductive pieces, for example 24a, of the second conductive pattern is connected to the terminal 13. The outer pierphery end of one of the straight conductive pieces, for example 24h, of the second conductive pattern is connected to the outer periphery end of one of the third straight conductive pieces, for example 34a, of the third conductive pattern. The outer periphery end of one of the third straight conductive pieces, for example 34h, of the third conductive pattern is connected to an output terminal 17. Thus, the first, second and third conductive patterns 10, 20 and 30 are connected in series with respect to the terminal 12 of the first conductive pattern 10 to be terminated to the terminal 17. Thus, the first, second and third conductive patterns are arranged in such a manner that the directions of paths from the terminal 12 through the first, second and third straight conductive pieces 14a, ..., 24a, ..., 34a, ... to the terminal 17 are equal to directions of arrows shown in FIG. 2. In other words, a direction of a path of a conductive piece is opposite to that of its adjacent conductive pieces. Therefore, connection of the first, second and third conductive patterns between the terminals 12 and 17 is identical to an arrangement in which straight conductive pieces of one conductive pattern are disposed at 15-degree intervals.

Figure 3:
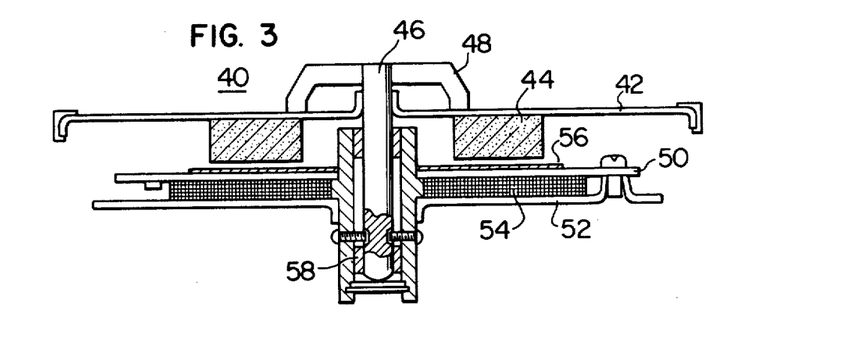
FIG. 3 is a sectional view of a direct current motor of an opposite flat plate type to which the frequency detector according to the present invention is applied.
Figure 4:
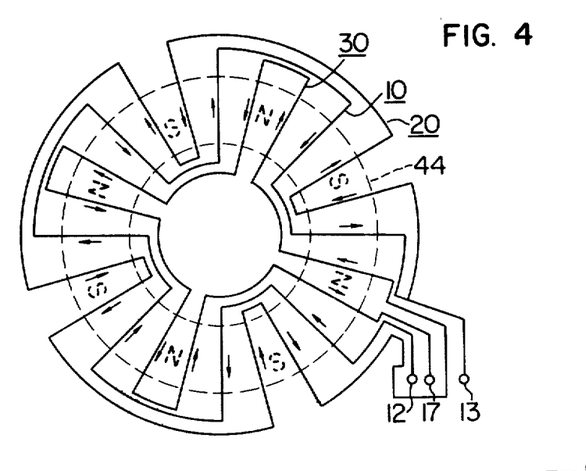
FIG. 4 is a plan view showing relationship between the conductive patterns of the frequency detector and magnetic poles of a rotor of the motor, in which the frequency detector shown in FIG. 2 is applied to the direct current motor in FIG. 3.

FIG. 3 shows a sectional view of a direct current motor 40 of an opposite flat plate type to which the frequency detector of the present invention shown in FIG. 2 is applied. In the drawing, reference numeral 42 denotes a rotor yoke or a turn table in the form of a round plate, 44 a permanent magnet in the form of ring and plate which is attached to a lower surface of the rotor yoke 42 in coaxial relationship with a spindle 46, 48 a hub, 50 a stator board in the form of a flat plate disposed in opposite and parallel relationship to the rotor yoke 42, 52 a stator yoke attached to a lower surface of the stator board 50, 54 stator windings mounted between the stator board 50 and the stator yoke 52, 56 a printed circuit board disposed in coaxial relationship with the spindle 46 and formed with printed patterns of the frequency detector according to the present invention as shown in FIG. 2 on its surface, and 58 porous metal bearings. The printed patterns of the frequency detector are printed on the board 56 in concentric relationship with the spindle 46 and also disposed in concentric and opposite relationship with the permanent magnet 44 as shown in FIG. 4. With such an arrangement, the generator is composed of the rotors 42 and 44 and the frequency detector operating as an armature.

Figure 5:
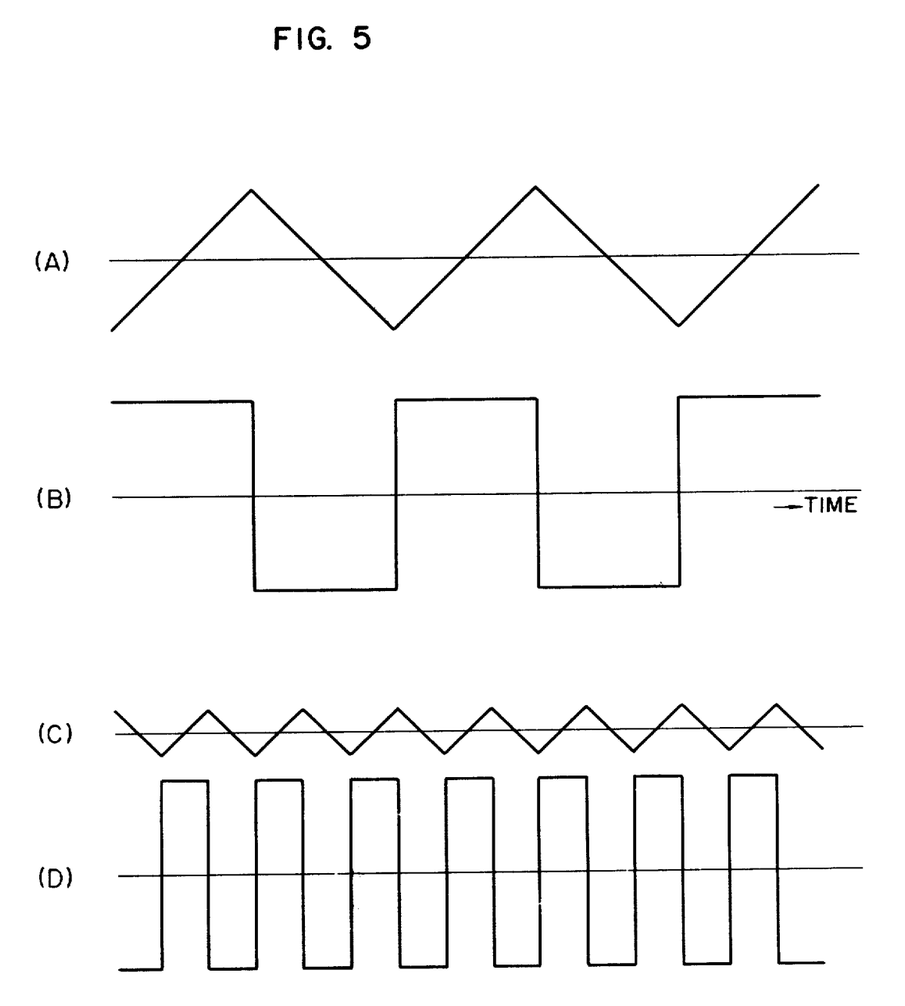
FIG. 5 is a timing chart showing operation of the frequency detector, in which the frequency detector shown in FIG. 2 is applied to the direct current motor in FIG. 3.

In such an arrangement, when the motor rotates, a first signal of the frequency obtained by the equation (2) can be obtained between the terminals 12 and 13 of the first conductive pattern 10 in the same manner as the prior art unit in FIG. 1. Suppose that the pole number l of the motor is 8 as shown in FIG. 4, for example, and since the total number of the straight conductive pieces m of the first conductive pattern is 8, m/l=1 which satisfies the condiction of the equation (1). Therefore, if the rotation speed of the motor is, for example, 600 r.p.m., N=10. A frequency f of the output signal derived from the terminals 12 and 13 as the first signal becomes 40 Hz in accordance with the equation (2). At this time, the magnetic field intensity that the straight conductive pieces of the first conductive pattern are influenced by the magnetic pole of the rotor is as shown by (A) in FIG. 5. The voltage waveform of the first signal obtained from the terminals 12 and 13 is as shown by (B) in FIG. 5.

Furthermore, since all of the straight conductive pieces 14a..., 24a..., and 34a... of the first, second and third conductive patterns are disposed in series between the terminals 12 and 17, the number m of the straight conductive pieces between the terminals 12 and 17 becomes 24. Therefore, m/l becomes 3, which satisfies the condition of the equation (1). In this case, if N is 10 in the same manner as the above, frequency f of the output signal obtained from the terminals 12 and 17 as the second signal becomes 120 Hz in accordance with the equation (2). At this time, the magnetic field intensity that the straight conductive pieces of the first, second and third conductive pattern connected in series are influenced by the magnetic pole of the motor is as shown by (C) in FIG. 5. The voltage waveform of the second signal obtained from the terminals 12 and 17 is as shown by (D) in FIG. 5.

Consequently, according to the above embodiment, the single frequency detector produces the first signal with a relatively low frequency desirable as the phase information between the terminals 12 and 13, and also produces the second signal with a higher frequency than that of the first signal desirable as the speed information. Therefore, two kinds of frequency signals suitable for the speed control and the phase control of the motor can be obtained separately and simultaneously from the inexpensive frequency detector.

In the above embodiment, the corresponding ones of the conductive pieces 15a..., 25a... and 35a..., and 16a..., 26a... and 36a... in the form of circular arcs of the first, second and third conductive patterns, for example the conductive pieces 15a, 25a and 35a, are desirably disposed as close as possible to each other so that the lengths of all of the straight conductive pieces 14a..., 24a... and 34a... are as equal as possible to each other. If the lengths of the respective straight conductive pieces are different, the numbers of the magnetic fluxes crossing respective straight conductive pieces are different to each other, so that there is a possibility that the first signal with the low frequency leaks into the second signal with the high frequency.

However, if the inner periphery end of each of the straight conductive pieces of the respective conductive patterns is disposed at an inner position nearer to the central portion than the inner edge of the rotor magnet 44 of the motor and the outer periphery end of each of the straight conductive pieces thereof is also disposed at a position outer from the central position than the outer edge of the rotor magnet 44 of the motor, the numbers of the magnetic fluxes crossing the respective straight conductive pieces are nearly equal to each other since the flux does not almost exist except just under the magnet 44 even if the lengths of the respective straight conductive pieces are slightly different from each other. Therefore, the first signal with the low frequency is almost prevented from leaking into the second signal. The second signal with high frequency and good waveform and the first signal with low frequency and good waveform both can obtained from the single frequency detector. Furthermore, in this case, the inner and outer periphery conductive pieces of each of the respective conductive patterns are not required to be disposed exactly on the inner and outer circumferences respectively.

In the above embodiment, the pole number of the motor is 8. However, any other pole numbers may be used as long as the equation (1) is satisfied.

Furthermore, in the above embodiment, although the number of the straight conductive pieces of each of the conductive patterns is 8, it may be 2n (where n≧2). In this case, the more the number of the straight conductive pieces of the respective conductive pattern increases, the more the frequencies of the first and second signals increase.

Suppose that the numbers of the straight conductive pieces of the first, second and third conductive patterns are a, b and c, respectively, the relation between a, b and c is a:b:c = 1:1:1 in the above embodiment. However, the relation may be a:b:c = 1:n:n (where n is an integer not less than 2). Thus, a ratio of the frequency of the second signal to that of the first signal can be increased.

Figure 6:
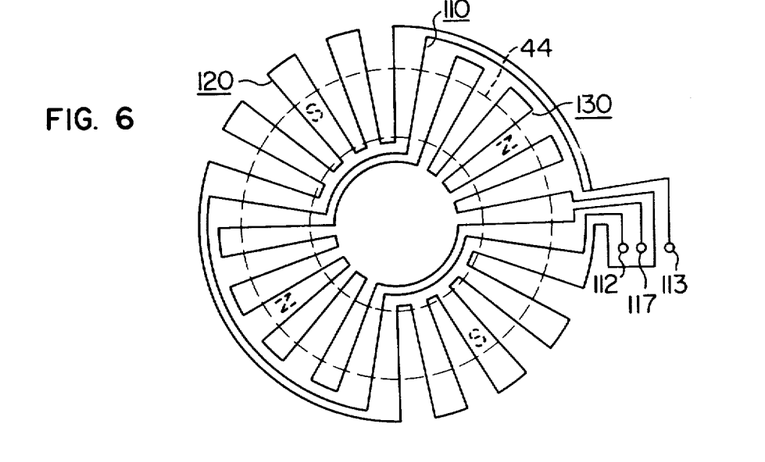
FIG. 6 is a plan view showing conductive patterns of a second embodiment of the frequency detector according to the present invention.

FIG. 6 shows an example in which the relation of the numbers a, b and c is a:b:c = 1:n:n (where n≧2). In FIG. 6 showing a second embodiment of the frequency detector according to the present invention, the number of the straight conductive pieces of the first conductive pattern is 4 and the number of the straight conductive pieces of each of the second and third conductive patterns is 16, so that the relation among the numbers of the straight conductive pieces of the first, second and third conductive patterns is a:b:c = 1:4:4. Namely, eight straight conductive patterns are disposed as second and third straight conductive pieces between each pair of adjacent two first straight conductive pieces of a first conductive pattern. The first straight conductive pieces of the first conductive pattern 110 are disposed at regular intervals of 90 degrees. The second and third straight conductive pieces of the second and third conductive patterns 120 and 130 are disposed between the adjacent two first straight conductive patterns with intervals equal to one-nineth interval of the first straight conductive pieces, that is at intervals of 10 degrees. Therefore, the number of the first straight conductive pieces is 4 and the total number of the straight conductive pieces of the first, second and third conductive patterns is 36.

In this embodiment, both ends of the first conductive pattern 110 are connected to output terminals 112 and 113 in the same manner as the first embodiment. The first, second and third conductive patterns are connected in series between terminals 112 and 117 so that the first, second and third straight conductive pieces disposed at intervals of 10 degrees are connected in series.

The frequency detector constructed above may be applied to the motor of the opposite flat plate type shown in FIG. 3 in the same manner as the first embodiment. Suppose that the pole number of the motor is, for example 4, the first signal obtained between terminals 112 and 113 and the second signal obtained between terminals 112 and 117 are as follows.

Since the pole number 1 of the motor is 4 and the number m of the straight conductive pieces between terminals 112 and 113 and terminals 112 and 117 is 4 and 36, respectively, the condition of the equation (1) is satisfied in either case. Therefore, if the rotation speed of the motor is 600 r.p.m., N of the equation (2) is 10. From the equation (2), two frequency signals of the first signal with 20 Hz and the second signal with 180 Hz can be obtained between terminals 112 and 113 and between terminals 112 and 117, respectively. Thus, in this embodiment, the single frequency detector disposed on a single printed circuit board can produce a speed information signal with a frequency high than that of the first embodiment and a phase information signal with a frequency lower than that of the first embodiment.

Figure 7:
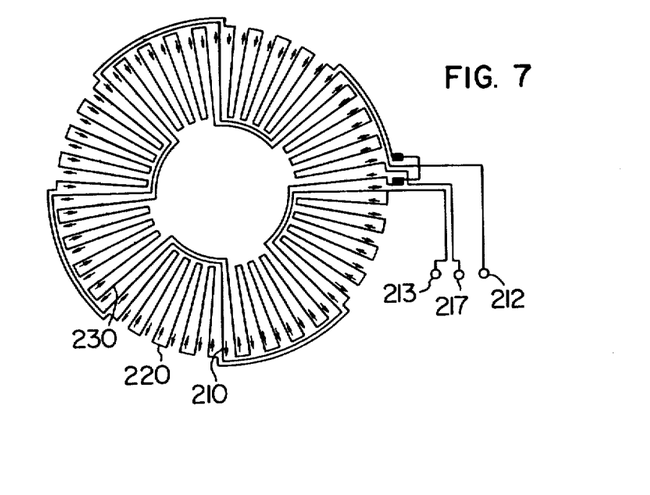
FIG. 7 is a plan view showing conductive patterns of a third embodiment of the frequency detector according to the present invention.

In FIG. 7 showing a third embodiment, the number of the first straight conductive pieces of a first conductive pattern 210 is 8 and the number of each of the second and third straight conductive pieces of second and third conductive patterns 220 and 230 is 32.

Namely, eight straight conductive pieces are disposed between each pair of the adjacent two first straight conductive pieces as second and third straight conductive pieces. Therefore, the relation of the numbers of the straight conductive pieces of the first, second and third conductive patterns is a:b:c = 1:4:4. The first straight conductive pieces of the first conductive pattern are disposed at intervals of 45 degrees and the second and third straight conductive pieces of the second and third conductive pattern are disposed at intervals of 5 degrees between the adjacent two first straight conductive pieces.

If the frequency detector constructed above is applied to the motor of the opposite flat plate type in FIG. 3, the first signal obtained between terminals 212 and 213 and the second signal obtained between terminals 212 and 217 are as follows.

The pole number 1 of the motor is, for example, 8. The number m of the first straight conductive pieces for the first conductive pattern is 8. The total number m of the straight conductive pieces for the first, second and third conductive patterns is 72. Therefore, the condition of the equation (1) is satisfied in either case. If the rotation speed of the motor is 600 r.p.m., N in the equation (2) is 10. According to the equation (2), two frequency signals of the first signal with 40 Hz and the second signal with 360 Hz can be obtained between terminals 212 and 213 and between terminals 212 and 217, respectively. Thus, in this embodiment, the frequency of the speed information is higher than that of the first embodiment. Thus, the single frequency detector disposed on a printed circuit board can produce two frequency signals suitable for the speed control and the phase control.

Figure 8:
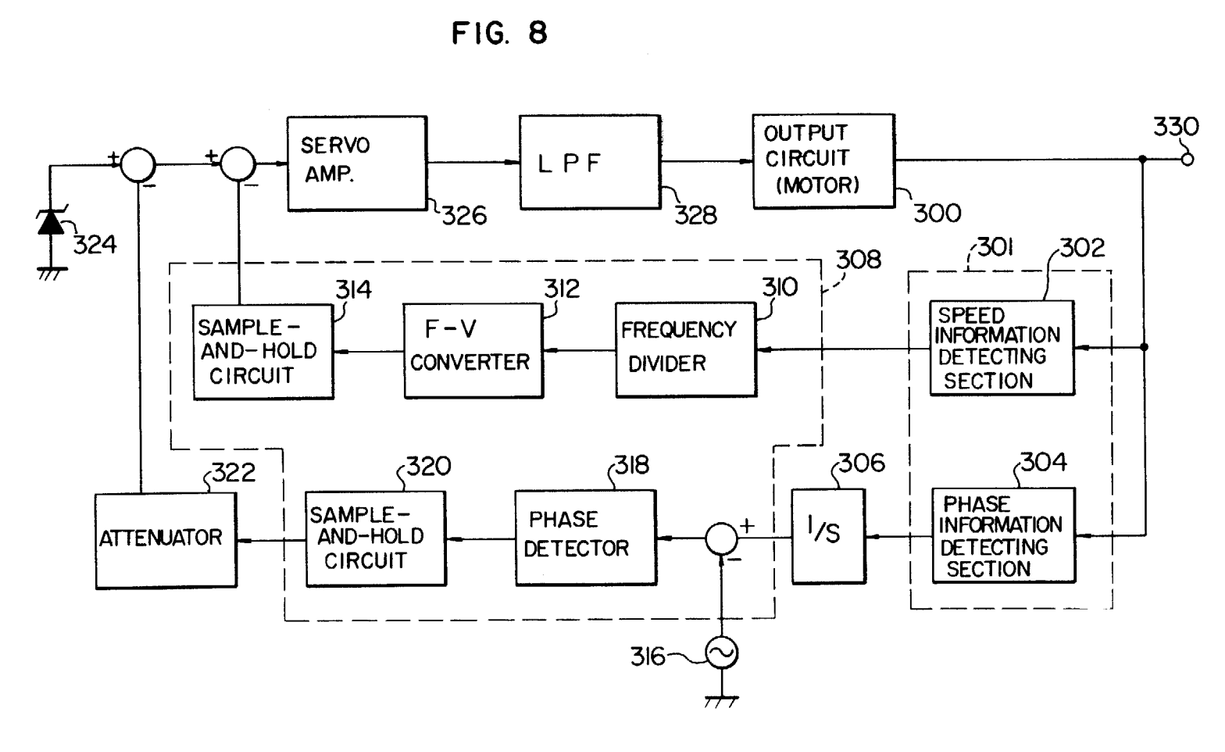
FIG. 8 is a block diagram of the frequency detector according to the present invention which is applied to a servo-system of a motor.

FIG. 8 is a block diagram of an exemplary servo control system for a direct current motor in which the frequency detector according to the present invention is applied to the direct current motor of an opposite flat plate type as shown in FIG. 3.

The frequency detector according to the present invention is incorporated in an output circuit or an opposite flat plate type direct current motor 300 as shown in FIG. 3. A first signal indicating a phase information is generated from a phase information detecting section 304 (corresponding to the first conductive pattern) in the detector 301 and a second signal indicating a speed information is generated from a speed information detecting section 302 (corresponding to the series circuit of the first, second and third conductive patterns) in the detector 301. The second signal is applied to a control IC 308 in which the second signal is divided by a frequency divider 310 to be applied to a frequency-to-voltage converter 312. An output voltage of the converter 312 is supplied to a sample-and-hold circuit 314 which holds the output voltage until next sampling. An output voltage from the sample-and-hold circuit 314 is compared with a reference speed voltage from a reference speed voltage generator 324 to produce an output error voltage. The output error voltage is amplified by a servo amplifier 326 and the low pass filter 328 reduces discontinuity of the signal due to sampling to be applied to the output circuit 300. Thus, speed control operation is made.

On the other hand, the second signal from the phase information detecting section 304 is applied to an integrating element 306 which is provided because this system is integration control system. The output phase signal of the integrating element 306 is compared with a reference phase signal from a reference phase signal generator 316. The difference between the output phase signal and the reference phase signal is detected by a phase detector 318 to be added to the reference speed voltage through a sample-and-hold circuit 320 and an attenuator 322.

The output rotation of the motor controlled on the basis of the phase information and the speed information is derived from a terminal 330.

As described above, the frequency detector according to the present invention can produce the two different frequency signals at the same time by adding two further conductive patterns to the prior art frequency detector shown in FIG. 1.

In the above description, the frequency detector according to the present invention is applied to the opposite flat plate type motor. However, it may be applied to any other types of motors and be used to detect phase information and speed information of a rotating device having a magnetic pole except a motor.

I claim:

1. A frequency detector comprising:
a first conductive pattern including an even number of first straight conductive pieces disposed radially at first predetermined intervals, a plurality of first outer periphery conductive pieces each connecting an outer periphery end of corresponding one of said first straight conductive pieces to an outer periphery end of the first straight conductive piece adjacently disposed at one side of said corresponding one of said first straight conductive pieces, and a plurality of first inner periphery conductive pieces each connecting an inner periphery end of said corresponding one of said first straight conductive pieces to an inner periphery end of the first straight conductive piece adjacently disposed at the other side of said corresponding one of said first straight conductive pieces, said first straight conductive pieces being sequentially connected in series alternately through said first inner periphery conductive pieces and said first outer periphery conductive pieces;
a second conductive pattern including an even number of second straight conductive pieces disposed radially at second predetermined intervals between each pair of said first straight conductive pieces connected by said first inner periphery conductive piece and at the outer periphery side of said first inner periphery conductive piece, said second straight conductive pieces being sequentially connected in series;
a third conductive pattern including an even number of third straight conductive pieces disposed radially at said second predetermined intervals between each pair of said first straight conductive pieces connected by said first outer periphery conductive piece and at the inner periphery side of said first outer periphery conductive piece, said third straight conductive pieces being sequentially connected in series;
first and second terminals connected to both ends of said first conductive pattern, respectively;
means for connecting in series said first, second and third conductive patterns from said second terminal; and
a third terminal connected to one end of a series circuit of said first, second and third conductive patterns of which the other end is connected to said second terminal.

2. A frequency detector according to claim 1, wherein said second predetermined interval is equal to divided that obtained by dividing said first predetermined interval by an odd number not less than 3, so that said first, second and third straight conductive pieces are disposed with said second predetermined intervals to each other.

3. A frequency detector according to claim 1, wherein a direction of a path of said series circuits of said first, second and third conductive patterns from said first terminal to said third terminal is different from each other between respective adjacent two of said first, second and third straight conductive pieces.

4. A frequency detector according to claim 1, wherein said second conductive pattern including a plurality of second outer periphery conductive pieces each connecting an outer periphery end of corresponding one of said second straight conductive pieces to an outer periphery end of the second straight conductive piece adjacently disposed at one side of said corresponding one of said second straight conductive pieces, and a plurality of second inner periphery conductive pieces each connecting an inner periphery end of said corresponding one of said second straight conductive pieces to an inner periphery end of the second straight conductive piece adjacently disposed at the other side of said corresponding one of said second straight conductive pieces, said second straight conductive pieces being sequentially connected in series alternately through said second inner periphery conductive pieces and said second outer periphery conductive pieces, said third conductive pattern including a plurality of third outer periphery conductive pieces each connecting an outer periphery end of corresponding one of said third straight conductive pieces to an outer periphery end of the third straight conductive piece adjacently disposed at one side of said corresponding one of said third straight conductive pieces, and a plurality of third inner periphery conductive pieces each connecting an inner periphery end of said corresponding one of said third straight conductive pieces to an inner periphery end of the third straight conductive piece adjacently disposed at the other side of said corresponding one of said third straight conductive pieces, said third straight conductive pieces being sequentially connected in series alternately through said third inner periphery conductive pieces and said third outer periphery conductive pieces, said second outer and inner periphery conductive pieces being respectively disposed at the outer side of said first outer and inner periphery conductive pieces, and said third outer and inner periphery conductive pieces being respectively disposed at the inner side of said first outer and inner periphery conductive pieces.

5. A frequency detector according to claim 4, wherein said first, second and third outer periphery conductive pieces and said first, second and third inner periphery conductive pieces are in the form of arcs and disposed on different concentric circles respectively.

6. A frequency detector according to claim 1, wherein a ratio among numbers of said first, second and third straight conductive pieces is 1:n:n, where n is an integer.

* * * * *